Patented Dec. 18, 1951

2,578,683

UNITED STATES PATENT OFFICE 2,578,683

PROTECTIVE COMPOSITIONS AND METHOD

Stuart O. Fiedler and Johan Bjorksten, Chicago, Ill., and Luther L. Yaeger, Hammond, Ind., assignors to Nash-Kelvinator Corporation, Kenosha, Wis., a corporation of Maryland No Drawing. Application February 21, 1947, Serial No. 730,193

8 Claims. (Cl. 260—17)

This invention relates to articles made of polystyrene and more specifically to such articles, covered with a surface coating which imparts to them a greatly enhanced resistance to abrasives, solvents and to other destructive influences; to modes of preparing and applying such surface coating materials for polystyrenes.

Polystyrene is a widely employed construction material. For example, it is being used in refrigeration equipment and also in automotive and aircraft industries for structural as well as decorative purposes. However, the utility of polystyrene is greatly restricted by certain undesirable properties, namely: 1. Very high electrostatic charges which cause excessive attraction for dust. 2. High susceptibility to scratching. (This does not bear a direct relation to the hardness of the article, inasmuch as the optical effects of scratching are more pronounced with polystyrene than with certain other material which actually having a lower hardness such as for example acrylates.) 3. Clouding or dissolving of the styrene surface by commonly used cleaning fluids.

Any one of these reasons is sufficient to greatly reduce the applicability of polystyrene as a material for many articles where it would otherwise be desirable by virtue of its excellent physical and mechanical properties and its relatively low price.

In the past, it has been attempted to apply various kinds of coating to polystyrene for added surface protection and to improve its properties. These attempts have all been unsuccessful. Coatings of shellac, while soluble in solvents which do not attack the polystyrene are not sufficiently tenacious to give the protection desired. Furthermore, they are soluble in alcoholic cleaning fluids. Ethyl cellulose coatings of the polystyrenes and of their derivatives have also been tried, and while these possess a considerable resistance to many solvents and to electrostatic influences they are not very scratch resisting, and, above all, they fail to bond to the polystyrene. It can be said generally that these coatings of prior art which bond firmly to the polystyrene are soluble only in solvents which are also solvents for polystyrene, and which therefore etch and cloud it, and that coatings of prior art reasonably suitable in other regards fail to adhere to polystyrene.

The present invention has for an object to overcome the disadvantages just mentioned. Another object is to provide a novel coating for polystyrene which forms an integral bond therewith, and which imparts to polystyrene enhanced resistance to scratching, reduced electrostatic sensitivity, and greatly enhanced resistance to cleaning fluids. A further object is a polystyrene article protected by such a coating. A still further object is a process of applying to the polystyrene articles a protective coating integrally bonded thereto. Further objects will become apparent as the following detailed description proceeds.

In accordance with preferred embodiment of this invention we employ a solution of a cellulose acetate in which a portion of the cellulose hydroxyl groups is reacted with an aliphatic acid selected from the group of acids having less than four carbon atoms, and at least one carboxyl group remains free. One aspect of this invention is thus to protect a styrene surface with a film-forming cellulose derivative which has at least one free carboxyl group.

We further found that film forming substances having an aromatic ring structure generally tend to have an improved affinity to styrene.

The very best bonds were obtained by the use of film forming solvent soluble cellulose derivatives which at the same time contained a free carboxyl group, and an aromatic ring. Such are for example esters of cellulose in which at least one hydroxyl is esterified with a polybasic aromatic acid, so as to leave at least one free carboxyl group not attached to the cellulose where the other cellulose hydroxyl groups are esterified with lower aliphatic radicals. For example, cellulose acetate hydrogen phthalate proved particularly suitable. Other substances which proved particularly suitable are cellulose propionic acid hydrogen salicylate, cellulose acetate mono B 2,4 naphthoyl dipropionate; cellulose acetate propionate B-6 carboxylic naphthoyl propionate; cellulose acetate 1,4 dicarboxylanthraquinone. The reaction product between incompletely esterified cellulose acetate and monobenzyl citrate, and the like. This is illustrated by the following examples:

Example 1

| | |
|---|---|
| Cellulose acetate hydrogen phthalate | 11 |
| Methyl ethyl ketone | 22 |
| Ethylene glycol monomethyl ether | 45 |
| Ethylene glycol monoethyl ether | 22 |

The ingredients were mixed in a closed tank, with agitation, until homogeneous. The solution thus obtained was sprayed on to polystyrene panels. The panels were dried at room temperature. The resultant coating was approximately 40% more mar resistant than the styrene, and was resistant to gasoline, lubricating oils and carbon tetrachloride. On friction with a wool cloth it generated much less static electricity than did a polystyrene uncoated panel.

The ingredients were mixed until a homogeneous solution was obtained. A polystyrene panel was dipped rapidly in the solution, and dried at a temperature of 55° C. The resultant coating was 24% more mar resistant and 21% more polishable than polystyrene, as measured by the ASTM test procedure D 673–42T, and was resistant to gasoline, lubricating oils and carbon tetrachloride.

*Example 2*

| | Percent by weight |
|---|---|
| Cellulose acetate hydrogen phthalate | 14 |
| "Staybelite" ester gum (a rosin ester product made by the Hercules Powder Company) | 2 |
| Acetone | 17 |
| Ethylene glycol monomethyl ether | 32 |
| n-Butanol | 9 |
| Diacetone alcohol | 10 |
| Ethyl acetate | 16 |
| | 100 |

This lacquer was sprayed on sheet polystyrene and the coating dried by infra red lamps with a circulating air temperature of 52° C. The resulting film was more resistant to scratching, gasoline, and cleaning fluids than was the bare polystyrene.

*Example 3*

| | Percent by weight |
|---|---|
| Cellulose acetate hydrogen phthalate | 12 |
| Methyl methacrylate polymer | 1 |
| Methyl ethyl ketone | 15 |
| Toluol | 10 |
| Ethylene glycol monoethyl ether | 35 |
| Ethyl lactate | 5 |
| Diacetone alcohol | 12 |
| Isopropyl acetate | 10 |
| | 100 |

This lacquer was brushed onto the polystyrene panels and allowed to dry. It formed a transparent coating, of mar resistance superior to that of polystyrene.

For application, the cellulose acetate aromatic acid esters mentioned were dissolved in a suitable organic solvent combination. Each solvent combination must be a good solvent for the resins employed, and also substantially a non-solvent for styrene. Usually, 3 to 35% of the lacquer content, constituted the non-volatile ingredients stated herein.

Suitable solvent combinations contain for example 3 to 30%, and preferably 7 to 17% of a volatile solvent selected from the group consisting of aliphatic ketones or esters having less than 6 carbon atoms, such as methyl ethyl ketone, acetone, methyl propyl ketone, diethyl ketone, ethyl formate, methyl acetate, ethyl acetate, and aliphatic nitro compounds having from 2 to 5 carbon atoms, ethyl propionate and the like. Small amounts of chlorinated solvents may be included, in which case the percentage of aliphatic alcohols stated below should be kept in the upper range stated, to compensate for the activity on polystyrene of chlorinated solvents. Further ingredients are 7 to 35% or preferably 10 to 20% of a solvent selected from the group consisting of nitro methane and aliphatic alcohols having less than 5 carbon atoms, 30 to 80% or preferably 40 to 60% of a medium volatile solvent selected from the group consisting of ethylene glycol mono methyl ether, ethylene glycol mono ethyl ether, diacetone alcohol, butyl acetate, butyl propionates and methyl, ethyl- and propyl lactates.

Obviously, moderate amounts of other solvents can be added, if care is taken to maintain the solvent balance so that on the one hand the solvent is sufficiently active to keep the solids dissolved thruout the evaporation range, and secure enough action on styrene to permit a good bond, yet so that it will not be so active as to etch the polystyrene surface with consequent loss of transparency the activity of the solvent combination is increased by an increase for example in the percentage of ketone type solvents in the high volatility range, or of glycol esters in the low volatility range; and is decreased by the reduction in the relative proportions of these ingredients in favor of for example nitro methane, aliphatic alcohols, lactates or ethylene glycol mono methyl ether, or saturated aliphatic hydrocarbons. With these data further illustrated by the examples, the skilled chemist will be able to make any modifications or substitutions in the solvents, as may be desired. Dyestuffs, pigments, plasticizers, and the like may also be introduced if desired.

The resinous ingredients were dissolved in the said solvent mixture usually to the extent of approximately ten to thirty percent but not necessarily confined to these ranges. The resultant composition may be applied to the styrene surface either by spraying, brushing, by dipping or in any other suitable manner that may be apparent to those skilled in the art.

The ratio between solvent and solids in the composition is immaterial to the invention. This ratio does not affect the characteristics of the coating, but only its thickness.

As an alternative mode of application we may also apply a sheet of the cellulose acetate hydrogen phthalate and calender it on to a polystyrene surface at a temperature sufficiently high to maintain these substances in a soft and fusible condition. However, for most purposes the applications from solvent solutions were found much more convenient and practical.

While reference has been made throughout this application to polystyrene it is fully understood that this term includes such co-polymers or modified products as are commercially known under the generic term styrene type resins. This includes co-polymers between styrenes and acrylates-co-polymers with acrylonitrile and like materials known as being suitably co-polymerizable with styrene. The di-vinyl benzenes and their polymers and co-polymers are also included in the generic terms polystyrenes.

It is thus seen that the invention is of broad scope, and is not to be limited excepting by the claims, in which it is our intention to cover all novelty inherent in the invention as broadly as possible, in view of prior art.

We claim:

1. An article of manufacture comprising a polystyrene surface, said surface having a coating integrally bonded thereto, said coating comprising as an essential ingredient cellulose acetate hydrogen phthalate integrally bonded to such polystyrene surface.

2. An article of manufacture comprising a polystyrene surface, and an integrally bonded coating adherent thereto, said coating comprising an aromatic cellulose derivative having at least one free carboxyl group.

3. A coating composition which is substantially a non-solvent for polystyrene and a solvent for the coating materials dissolved therein, said coating composition comprising from 3 to 30% of a volatile solvent selected from the group consisting of aliphatic ketones and esters having 1 to 5 carbon atoms, from 7 to 35% of a solvent selected from the group consisting of nitromethane and aliphatic alcohols having 1 to 4 carbon atoms; 30 to 80% a medium volatile solvent selected from the group consisting of ethylene glycol mono methyl ether, ethylene glycol mono ethyl ether, diacetone alcohol, butyl acetate, butyl propionate and methyl, ethyl and propyl lactates, and 3 to 35% of a non volatile composition comprising as an essential ingredient an aromatic cellulose derivative having at least one free carboxyl group the said cellulose derivative being an aromatic polycarboxylic acid ester of a cellulose ester of an aliphatic acid having less than four carbon atoms.

4. A composition of matter comprising cellulose acetate hydrogen phthalate and polymethyl methacrylate, in the proportions of about 12 to 1, as solutes, and the organic solvent composition therefor, said organic solvent composition comprising from 7 to 17% of a volatile solvent selected from the group consisting of aliphatic ketones and esters having 1 to 5 carbon atoms, 10 to 20% of a solvent selected from the group consisting of nitromethane and aliphatic alcohols having 1 to 4 carbon atoms, and 40 to 60% of a medium volatile solvent selected from the group consisting of ethylene glycol monomethyl ether, ethylene glycol monoethyl ether, diacetone alcohol, butyl acetate, butyl propionate, and methyl, ethyl and propyl lactates.

5. A composition of matter comprising cellulose acetate hydrogen phthalate and polymethyl methacrylate, in the proportions of about 12 to 1, as solutes, and the organic solvent composition therefor, said organic solvent composition comprising from 3 to 30% of a volatile solvent selected from the group consisting of aliphatic ketones and esters having 1 to 5 carbon atoms, from 7 to 35% of a solvent selected from the group consisting of nitromethane and aliphatic alcohols having 1 to 4 carbon atoms, 30 to 80% of a medium volatile solvent selected from the group consisting of ethylene glycol monomethyl ether, ethylene glycol monoethyl ether, diacetone alcohol, butyl acetate, butyl propionate and methyl, ethyl, and propyl lactates.

6. An article of manufacture comprising a polystyrene surface, and an integrally bonded coating adherent thereto, said coating comprising a polycarboxylic acid ester of cellulose having at least one unesterified carboxyl group and also aliphatic acyl groups containing less than four carbon atoms.

7. An article of manufacture, comprising a polystyrene surface and an integrally bonded coating adherent thereto, said coating comprising cellulose acetate hydrogen phthalate and polymethyl methacrylate.

8. An article of manufacture comprising at least one polystyrene surface having firmly bonded thereto a coating comprising an aromatic polycarboxylic acid ester of a cellulose ester of an aliphatic acid having less than four carbon atoms, said ester having at least one free carboxyl group.

STUART O. FIEDLER.
JOHAN BJORKSTEN.
LUTHER L. YAEGER.

REFERENCES CITED

The following references are of record in the file of this patent:

UNITED STATES PATENTS

| Number | Name | Date |
| --- | --- | --- |
| 1,954,337 | Staud | Aug. 10, 1934 |
| 2,069,974 | Schulze | Feb. 9, 1937 |
| 2,093,462 | Malm et al. | Sept. 21, 1937 |
| 2,148,381 | Slauter et al. | Feb. 21, 1939 |
| 2,202,804 | Wampner et al. | May 28, 1940 |
| 2,238,694 | Graves | Apr. 15, 1941 |
| 2,254,904 | Moss | Sept. 2, 1941 |
| 2,292,393 | Mitchell | Aug. 11, 1942 |
| 2,332,461 | Muskat et al. | Oct. 19, 1943 |
| 2,420,720 | Pechukas et al. | May 20, 1947 |

FOREIGN PATENTS

| Number | Country | Date |
| --- | --- | --- |
| 489,725 | Great Britain | Aug. 3, 1938 |